Patented July 6, 1948

2,444,478

UNITED STATES PATENT OFFICE 2,444,478

TETRACHLOROBUTYRONITRILE

John W. Teter and Oscar W. Bauer, Chicago, Ill., assignors to Sinclair Refining Company, New York, N. Y., a corporation of Maine No Drawing. Application October 14, 1944, Serial No. 558,750

1 Claim. (Cl. 260—465.7)

This invention relates to new chlorinated butyronitriles, and more particularly to butyronitriles twice substituted in the 2-position by chlorine. More particularly the invention relates to 2,2,$x$,$x$,-tetrachlorobutyronitrile. In the present application the numbers, indicating the position of the chlorine substituents, identify the carbon atoms as numbered in the following formula for butyronitrile.

$$\overset{4}{C}H_3\overset{3}{C}H_2\overset{2}{C}H_2\overset{1}{C}N$$

The new compounds of the invention have value as insecticides and insect repellents, as intermediates for the synthesis of other chemicals, as solvents, and for other purposes. Thus, the new compounds can be converted to the corresponding amides, can be dehydrohalogenated to give unsaturated chlorinated nitriles, etc.

The new compounds may be prepared by the liquid phase, light-activated, direct chlorination of butyronitrile. Advantageously, this chlorination is carried out by leading chlorine in to the butyronitrile while maintaining its temperature around 60 to 70° C. and exposing the material to actinic rays, as from a mercury light. The reaction proceeds smoothly. Advantageously the rate of feed of the chlorine is such that substantially all of it is absorbed as fed. The reaction may be carried out over a period of about forty hours, to the required reaction mixture density. Chlorination to a density of 1.21 gives a product with substantial proportions of the 2,2-di- and 2,2,3-tri- and 2,2,4-trichlorobutyronitriles. Chlorination to a density of 1.28 gives a product with substantial proportions of the two trichloro compounds and the tetrachloro compound, with less of the dichloro compound. The polychlorinated butyronitriles produced are all twice substituted in the 2-position. They may be separated by fractional distillation. The products are liquids at ordinary temperature, and have densities greater than that of water. 2,2-dichlorobutyronitrile boils around 64° C. at 82 mm., 2,2,3-trichlorobutyronitrile around 82° C. at 40 mm., 2,2,4-trichlorobutyronitrile around 89° C. at 40 mm., and the tetrachlorobutyronitrile at 113.5° C. at 50 mm.

The invention will be further illustrated by the following specific example, but it is not limited thereto:

Example.—Butyronitrile was charged into a glass vessel, and exposed to the light of a G. E. S-1 type mercury light. Chlorine was admitted into the bottom of the vessel. The temperature was held between 60 and 70° C. by adjustment of the position of the lamp and regulation of the supply of chlorine. The chlorine was supplied at a rate such that most of it reacted, little passing from the top of the vessel. Reaction gases were collected in a water condenser. The procedure was continued for about 45 hours. The product was immediately stabilized by refluxing for several hours to remove as much of the hydrogen chloride as possible. The stabilized product was then fractionated, yielding the three products described above which were isolated at the distillation temperatures and pressures stated. In one run the total yield, based on the butyronitrile feed, calculated as mol percent, was 18.2% of the 2,2-dichlorobutyronitrile and 52.5% of the two trichlorinated products, that is, 2,2,3-trichlorobutyronitrile and 2,2,4-trichlorobutyronitrile. In another run, carried to a reaction mixture density of 1.39, the yield, based on the butyronitrile feed, calculated as mol percent, was 3.5% of 2,2-dichlorobutyronitrile, 27.4% of 2,2,3-trichlorobutyronitrile, 28.5% of 2,2,4-trichlorobutyronitrile and 26.2% of the tetrachlorobutyronitrile, which was probably 2,2,3,4-tetrachlorobutyronitrile, B. P. 113.5° C. at 50 mm.

$$d_4^{20}\ 1.4862$$

We claim:

Tetrachlorobutyronitrile in which the two 2-positions are substituted by chlorine, and which has a boiling point of approximately 113.5° C. at a pressure of 50 mm. of mercury and a density of approximately $$d_4^{20}\ 1.4862$$

JOHN W. TETER.
OSCAR W. BAUER.

REFERENCES CITED

The following references are of record in the file of this patent:

UNITED STATES PATENTS

| Number | Name | Date |
| --- | --- | --- |
| 2,174,756 | Pieroh | Oct. 3, 1939 |
| 2,231,838 | Lichty | Feb. 11, 1941 |
| 2,283,237 | Spence | May 19, 1942 |

OTHER REFERENCES

Piquet: Beilstein, Handbuch der Org. Chem., vol. 2, page 286 (1920), and vol. 9, page 895 (1926).

Lespieau: Beilstein, vol. 2, page 280 (1920).

Szenic et al: Beilstein, vol. 2, page 281 (1920).